United States Patent
Zellner et al.

(10) Patent No.: US 7,046,643 B1
(45) Date of Patent: May 16, 2006

(54) METHOD FOR DYNAMIC MULTI-LEVEL PRICING FOR WIRELESS COMMUNICATIONS ACCORDING TO QUALITY OF SERVICE

(75) Inventors: Samuel N. Zellner, Dunwoody, GA (US); Mark J. Enzmann, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/559,593

(22) Filed: Apr. 28, 2000

Related U.S. Application Data

(63) Continuation-in-part of application No. 08/903,534, filed on Jul. 30, 1997, now Pat. No. 6,069,882.

(51) Int. Cl.
| | |
|---|---|
| H04B 7/216 | (2006.01) |
| H04L 12/54 | (2006.01) |
| H04M 3/42 | (2006.01) |
| H04Q 7/20 | (2006.01) |

(52) U.S. Cl. .................. 370/329; 370/335; 370/342; 370/428; 379/266; 379/207; 455/450; 455/512

(58) Field of Classification Search .......... 370/328, 370/329, 335, 342, 395, 412, 428, 429, 468, 370/230, 232, 235, 252; 379/207, 229, 266, 379/265, 309; 455/445, 446, 512, 514

See application file for complete search history.

(56) References Cited

U.S. PATENT DOCUMENTS

| | | | |
|---|---|---|---|
| 4,803,679 A | 2/1989 | Shimizu | |
| 5,131,020 A | 7/1992 | Liebesny et al. | |
| 5,157,709 A | 10/1992 | Ohteru | |
| 5,226,071 A | 7/1993 | Bolliger et al. | |
| 5,343,511 A | 8/1994 | Osada | |

(Continued)

FOREIGN PATENT DOCUMENTS

| | | |
|---|---|---|
| EP | 0 370 826 | 5/1990 |
| EP | 0 717 579 | 6/1996 |
| EP | 0 752 793 | 1/1997 |
| WO | WO 97/11566 | 3/1997 |
| WO | WO 97/16040 | 5/1997 |

OTHER PUBLICATIONS

Data Communications (Tech Tutorials) "Going the Dstance with QOS", Mick Seaman and Bob Klessig, 3Com Corp., Feb., 1999.
Data Communications (Tech Tutorials) "Serving Up QOS End to End", Marguerite Reardon, Nov. 21, 1998.
Data Communications (Tech Tutorials) "The Policy Makers", Stephen saunders, May, 1999.
"Digital Cellular Telecommunications System (Phase 2+); Enhanced Multi–Level Precedence and Pre–emption Service (eMLPP)–Stage 1 (GSM 02.67)," European Telecommunications Standards Institute, Global System for Mobile Communications Technical Specification, Version 5.0.1, Jul. 1996.

(Continued)

Primary Examiner—Man Phan
(74) Attorney, Agent, or Firm—Merchant & Gould

(57) ABSTRACT

A method for pricing wireless communications services on a wireless network is described. A selection of a plurality of priorities available for transmitting a wireless communication transaction on a wireless network is provided, wherein the priority to be selected corresponds to the speed and allowable delay by which the transaction is to be transmitted. Transactions of lower priority are temporarily discontinued in favor of higher priority transactions when network capacity reaches a predetermined level. An amount is charged for the wireless communication transaction at a price corresponding to the priority and duration to be selected.

31 Claims, 8 Drawing Sheets

U.S. PATENT DOCUMENTS

| | | | |
|---|---|---|---|
| 5,404,355 A | | 4/1995 | Raith |
| 5,457,735 A | | 10/1995 | Erickson |
| 5,513,242 A | | 4/1996 | Mukerjee et al. |
| 5,521,925 A | | 5/1996 | Merakos et al. ............ 370/95.3 |
| 5,539,729 A | * | 7/1996 | Bodnar ....................... 370/232 |
| 5,539,923 A | | 7/1996 | Matsumoto |
| 5,570,411 A | * | 10/1996 | Sicher ......................... 455/450 |
| 5,574,977 A | | 11/1996 | Joseph et al. |
| 5,583,869 A | | 12/1996 | Grube et al. |
| 5,615,249 A | * | 3/1997 | Solondz ........................ 379/58 |
| 5,694,455 A | | 12/1997 | Goodman |
| 5,708,968 A | | 1/1998 | Suzuki |
| 5,729,541 A | | 3/1998 | Hamalainen et al. |
| 5,732,073 A | | 3/1998 | Kusaki |
| 5,742,588 A | | 4/1998 | Thornberg et al. |
| 5,752,193 A | | 5/1998 | Scholefield et al. |
| 5,761,618 A | | 6/1998 | Lynch et al. |
| 5,678,179 A | | 7/1998 | Turcotte et al. |
| 5,787,080 A | | 7/1998 | Hulyalkar et al. |
| 5,787,358 A | | 7/1998 | Takahashi |
| 5,790,522 A | * | 8/1998 | Fichou et al. ............... 370/236 |
| 5,812,656 A | * | 9/1998 | Garland et al. ............. 379/208 |
| 5,832,384 A | | 11/1998 | Balachandran et al. |
| 5,857,018 A | * | 1/1999 | Sumner et al. ............. 379/266 |
| 5,862,485 A | | 1/1999 | Linnewed, Jr. et al. |
| 5,867,790 A | | 2/1999 | Hamada |
| 5,914,945 A | | 6/1999 | Abu-Amara et al. |
| 5,926,469 A | | 7/1999 | Norstedt et al. |
| 5,930,239 A | | 7/1999 | Turcotte |
| 6,009,331 A | * | 12/1999 | Ueda .......................... 455/450 |
| 6,026,289 A | | 2/2000 | Zellner et al. |
| 6,069,882 A | | 5/2000 | Zellner et al. |
| 6,091,709 A | | 7/2000 | Harrison et al. |
| 6,101,389 A | | 8/2000 | Koizumi et al. |
| 6,175,621 B1 | * | 1/2001 | Begeja ........................ 379/207 |
| 6,192,248 B1 | * | 2/2001 | Solondz ....................... 455/450 |
| 6,201,966 B1 | | 3/2001 | Rinne et al. |
| 6,226,277 B1 | * | 5/2001 | Chuah ......................... 370/328 |
| 6,282,429 B1 | * | 8/2001 | Baiyor et al. ................ 455/512 |
| 6,321,093 B1 | * | 11/2001 | Dalal ........................... 455/512 |
| 6,327,364 B1 | * | 12/2001 | Shaffer et al. .............. 379/265 |
| 6,335,922 B1 | * | 1/2002 | Tiedemann, Jr. et al. ... 370/335 |
| 6,377,548 B1 | * | 4/2002 | Chuah ......................... 370/233 |
| 6,421,335 B1 | * | 7/2002 | Kilkki et al. ................ 370/342 |
| 6,434,380 B1 | * | 8/2002 | Andersson et al. .......... 455/406 |
| 6,470,024 B1 | | 10/2002 | Hamalainen et al. |
| 6,519,260 B1 | * | 2/2003 | Galyas et al. ............... 370/395 |
| 6,522,653 B1 | | 2/2003 | Kilkki |
| 6,549,938 B1 | | 4/2003 | Kilkki et al. |
| 6,567,416 B1 | * | 5/2003 | Chuah ......................... 370/418 |
| 6,587,433 B1 | * | 7/2003 | Borella et al. .............. 370/230 |

OTHER PUBLICATIONS

"Digital Cellular Telecommunications System (Phase 2+) Mobile Services Switching Centre–Base Station System (MSC–BSS) Interface; Layer 3 Specification (GSM 08.08)," European Telecommunications Standards Institute, Global System for Mobile Communications Technical Specification, Version 5.4.0, Nov. 1996.

International Search Report issued by European Patent Office in PCT/US98/15568, in the name of BellSouth Corporation, mailed Jan. 21, 1999.

Office Action issued by the USPTO having U.S. Appl. No. 09/559,594 on Feb. 24, 2004 (13 pages).

Office Action issued by the USPTO having U.S. Appl. No. 09/559,594, on Sep. 5, 2003 (16 pages).

Office Action issued by the USPTO having U.S. Appl. No. 09/922,042 on Dec. 18, 2003 (11 pages).

Office Action issued by the USPTO having U.S. Appl. No. 09/922,042 on May 8, 2003 (10 pages).

Office Action issued by the USPTO having U.S. Appl. No. 09/922,042 on Oct. 25, 2002 (7 pages).

Office Action issued by the USPTO having U.S. Appl. No. 09/579,000 on Feb. 5, 2001 (10 pages).

"Digital Cellular Telecommunications System (Phase 2+) (GSM); Universal Mobile Telecommunications System (UMTS); enhanced Multi–Level Precedence and Pre–emption Service (eMLPP)–Stage 3 (3G TS 24.067 version 3.0.0 Release 1999)," Global System for Mobile Communication, ETSI TS 124 067 3.0.0 v3.0.0 (2000–01).

"Digital Cellular Telecommunications System (Phase 2+) (GSM); Universal Mobile Telecommunications System (UMTS); enhanced Multi–Level Precedence and Pre–emption Service (eMLPP)–Stage 2 (3G TS 23.067 version 3.0.0 Release 1999)," Global System for Mobile Comunication, ETSI TS 123 067 3.0.0 v3.0.0 (2000–01).

"Digital Cellular Telecommunications System (Phase 2+) (GSM); Universal Mobile Telecommunications System (UMTS); Enhanced Multi–Level Precedence and Pre–emption Service (eMLPP)–Stage 1 (3G TS 22.067 version 3.0.1 Release 1999)," Global System for Mobile Communication, ETSI TS 122 067 V3.0.1 (2000–01).

"Digital Cellular Telecommunications System (Phase 2+) (GSM); Universal Mobile Telecommunications System (UMTS); Service Accessibility (3G TS 22.011 version 3.1.0 Release 1999)," Global System for Mobile Communication, ETSI TS 122 011 V3.1.0 (2000–01).

"Digital Cellular Telecommunications System (Phase 2+); High Speed Circuit Switched Data (HSCSD)–Stage 2 (GSM 03.34);" Global System for Mobile Communication, TS 101 038 V5.0.1 (1997–04).

"Digital Cellular Telecommunications System (Phase 2+); High Speed Circuit Switched Data (HSCSD)–Stage 1 (GSM 02.34)," Global System for Mobile Communication, ETSI GSM 02.34 V5.1.0, Mar. 1997.

"Universal Mobile Telecommunications System (UMTS); UTRAN lu Interface RANAP Signalling (3G TS 25.413 version 3.0.0 Release 1999)," ETSI TS 125 413 V3.0.0 (2000–01).

"Digital Cellular Telecommunications System (Phase 2); Specification of the Subscriber Identify Module–Mobile Equipment (SIM–ME) interface GSM 11.11 version 4.19.1)," European Telecommunication Standard, ETS 300 608, Jan. 1998.

In the Matter of "The Development of Operational, Technical and Spectrum Requirements for Meeting Federal, State and Local Public Safety Agency Communication Requirements Through the Year 2010," Federal Communications Commission FCC 00–242, Second Report and Order, Adopted Jul. 3, 2000, Released Jul. 13, 2000.

"Differential Channel Allocation," Function Specification 3/155 17–ANT 240 07 Uen B.

"Radio Equipment and Systems (RES); Trans–European Trunked Radio (TETRA); Voice plus Data (V+D); Part 1: General network design," European Telecommunications Standards Institute, ETS 300 392–1, Feb. 1996.

"Radio Equipment and Systems (RES); Trans–European Trunked Radio (TETRA); Voice plus Data (V+D); Part 2: Air Interference (AI)," European Telecommunications Standards Institute, ETS 300 392–2, Mar. 1996.

"Terrestrial Trunked Radio (TETRA); Voice plus Data (V+D); Part 12; Supplementary services stage 3; Sub–part 16: Pre–emptive Priority Call (PPC)," European Telecommunications Standards Institute, final draft ETSI EN 300 392–12–16 v1.2.0 (2004–05).

"Terrestrial Trunked Radio (TETRA); Voice plus Data (V+D); Part 11: Supplementary services stage 2; Sub–part 16: Pre–emptive Priority Call (PPC)," European Telecommunications Standards Institute, ETS 300 392–11–16, Sep. 2000.

Ttrans European Trunked Radio (TETRA) system; Technical requirements specification Part 1: Voice plus Data (V+D) systems: European Telecommunications Standards Institute, ETR 086–1, Jan. 1994.

"Radio Equipment and Systems (RES); Trans–European Trunked Radio system (TETRA); Voice plus Data (V+D) Open channel" European Telecommunications Standards Institute, ETR 120, Nov. 1994.

"Radio Equipment and Systems (RES); Trans–European Trunked Radio (TETRA); User requirements for Subscriber Identity Module (SIMS)" European Telecommunications Standards Institute, ETR 295, Aug. 1996.

"Terrestrail Trunked Radio (TETRA); Voice plus Data (V+D); Designers' guide; Part 1: Overview, technical description and radio aspects," European Telecommunications Standards Institute, ETR 300–1, May 1997.

"Radio Equipment and Systems (RES); Trans–European Trunked Radio (TETRA); Voice plus Data (V+D); Part 10: Supplementary Services stage 1; Part 10–01: Call identification" European Telecommunications Standards Institute, ETS 300 392–10–01, Apr. 1996.

"Radio Equipment and Systems (RES); Trans–European Trunked Radio (TETRA); Voice plus Data (V+D); Part 10: Supplementary Services stage1; Part 10–09: Access priority" European Telecommunications Standards Institute, ETS 300 392–10–09, Apr. 1996.

"Radio Equipment and Systems (RES); Trans–European Trunked Radio (TETRA); Voice plus Data (V+D); Part 10: Supplementary Services stage 1; Part 10–16: Pre–emptive priority call" European Telecommunications Standards Institute, ETS 300 392–10–16, Apr. 1996.

* cited by examiner

Figure 5A

| | | | | |
|---|---|---|---|---|
| Carrier | x | 2 | 3 | 4 |
| Application Developer | 1 | 2 | 3 | x |
| Customer | x | 2 | 3 | x |
| Available Priority | | 2 | 3 | |

Figure 5B

| | | | | |
|---|---|---|---|---|
| Carrier | x | x | x | 4 |
| Application Developer | 1 | 2 | 3 | 4 |
| Customer | x | x | x | 4 |
| Available Priority | | | | 4 |

Figure 5C

| | | | | |
|---|---|---|---|---|
| Carrier | 1 | 2 | 3 | 4 |
| Application Developer | 1 | 2 | 3 | x |
| Customer | 1 | 2 | 3 | x |
| Available Priority | 1 | 2 | 3 | |

Figure 6A

| Time | Handset Queue (in data packets) | Handset Side | Direction | Cell Side |
|---|---|---|---|---|
| 1 | 5 | Send control packet | → | Receive Control Packet |
| 2 | 5 | — | — | Evaluate Cell Capacity |
| 3 | 5 | — | — | Discontinue Lower Priority Transaction |
| 4 | 5 | Receive Authorization | ← | Send Authorization to Handset |
| 5 | 4 | Send Data Packet | → | Receive Data packet (Store in a buffer) |
| 6 | 3 | Send Data Packet | → | Receive Data Packet |
| 7 | 2 | Send Data Packet | → | Receive Data Packet |
| 8 | 2 | Receive Discontinue Message | ← | Generate Discontinue Message |
| 9 | 2 | — | — | Provide Access to Other Handsets |
| 10 | 2 | Receive Broadcast Message | ← | Broadcast Available Capacity |
| 11 | 2 | Send Control Packet | → | Receive Request |
| 12 | 2 | Receive Authorization | ← | Send Authorization |
| 13 | 1 | Send Data Packet | → | Receive Data Packet |
| 14 | 0 | Send Data Packet | → | Receive Data Packet |

Figure 6B

| Time | Handset A | Other Handsets | Cell Side |
|---|---|---|---|
| 1 | Sent Control Packet | Send Control Packet | Receive Control Packets |
| 2 | Receive Authorization | — | Send Authorization to Handset A |
| 3 | Send Data Packet | Receive Authorization | Receive Packet from "A"/Send Authorization to "Other" |
| 4 | — | Send Data Packet | Receive Packet from "Other" |
| 5 | Send Data Packet | Send Control Packet | Receive Data from "A" Receive Request from "Other" |
| 6 | Receive Data Packet | Receive Authorization | Send Incoming Packet to "A", & Authorization to "Other" |
| 7 | — | Send Data Packet | Receive Data Packet from "Other" |

Figure 7

| Time | Handset Queue (in data packets) | Handset Side | Direction | Cell Side |
|---|---|---|---|---|
| 1 | AAAA | Request Access Level 2 | → | Receive Request w/Priority 2 |
| 2 | BBAAAA | Receive Authorization | | Send Authorization |
| 3 | BBAAA | Send Data Packet A | → | Receive Data Packet A |
| 4 | BBAA | Send Data Packet A | → | Receive Data Packet A |
| 5 | BBAA | Receive Discontinue Message | | Send Discontinue Message |
| 6 | BBAACC | Request Access for Level 1 | → | Receive Request for Priority 1 |
| 7 | BBAAC | Receive Authorization | | Send Authorization |
| 8 | BBAA | Send Data Packet C | → | Receive Data Packet C |

METHOD FOR DYNAMIC MULTI-LEVEL PRICING FOR WIRELESS COMMUNICATIONS ACCORDING TO QUALITY OF SERVICE

This application is a continuation-in-part application of application Ser. No. 08/903,534, now U.S. Pat. No. 6,069,882 filed on Jul. 30, 1997 (the '882 patent). The present application claims priority from the '882 patent, which is incorporated herein by reference. The application also incorporates by reference U.S. application Ser. No. 09/559,594, filed Apr. 28, 2000.

FIELD OF THE INVENTION

The present invention relates to wireless communication services, and more particularly, to a method for dynamic allocation of limited capacity on a wireless network by pricing according to quality of service.

BACKGROUND OF THE INVENTION

Through the combination of wireless telephony and mobile computing technologies, digital wireless handsets are now available that can allow users to communicate with others by voice, e-mail, paging, facsimile, etc., and to transmit or receive information through the internet over a wireless network. Manufacturers of internet-capable telephones and personal digital assistants (PDA's) are coordinating with internet web site content providers to develop specialized versions of popular web sites for wireless access and interaction. In almost any location, while stationary or while in motion, consumers can use wireless networks to browse the world-wide web, participate in e-commerce transactions, join others through interactive game software, or communicate with others by voice or by other means through transmission of data.

Wireless cellular networks operate by establishing a communications link over radio waves between a mobile transmitter/receiver and a network transmitter/receiver located in the general vicinity of the mobile transmitter/receiver. Network transmitter/receivers each provide coverage for a limited geographical region, or cell, and are usually located near the center of the respective region on a cell tower. As a mobile transmitter/receiver is moved across different regions during a wireless communication, e.g., in an automobile, the call is transferred from one cell tower to the next.

For wireless communications, a bottleneck occurs during busy periods that can slow down communications because there are a limited number of radio links, or access points, into the wireless network. During the course of a day, the volume of subscribers requesting cellular service at cells in certain locations may overload the cell and strain capacity. For example, cells that are located near high traffic roadways that lead to a downtown city may be extremely busy during the morning and evening rush hours. Cells that are located near shopping malls in suburban areas may become congested during the weekend. Some cells may become overloaded during special events or holidays. Conversely, other cells may be relatively empty or unoccupied during certain times of the day. For example, cell sites in a downtown city may be unoccupied during the weekend, while many suburban cell sites are crowded.

When a cell site is operating at full capacity, the mobile transmitters/receivers may have to wait before obtaining access for communications. While a transmission delay may not be significant for an e-mail communication or a file transfer, the delay is probably not acceptable for voice-over-IP telephony or other time-sensitive communications. Under the current cellular service systems, which price airtime either according to "peak" and "nonpeak" time or a fixed rate with a number of minutes allotted, there is no incentive for subscribers to refrain from accessing the wireless network at a busy cell site, as opposed to waiting until the subscriber is located near an uncrowded cell site.

SUMMARY OF THE INVENTION

The present invention provides a method for pricing wireless communication services on a wireless network according to a transmission priority level that is designated for each transaction. A transaction is priced at a rate corresponding to the transmission priority level by which the transaction is transmitted over the network. For some types of wireless communications, subscribers can choose from a plurality of transmission priority levels. Transactions of higher priority are generally transmitted before transactions of lower priority.

When all access links are occupied on the wireless network, a transaction of comparatively low priority may be temporarily discontinued in favor of a request for a transaction of higher priority. Therefore, if a subscriber wants to ensure access to the wireless network for a particular transaction, the subscriber can designate a high priority for the transaction, in accordance with a subscriber plan according to the present invention. Conversely, if delivery time is not critical for another transaction, the subscriber can designate a low priority for the transaction. The usage amongst the cell sites is therefore maximized by pricing transactions according to their corresponding priority. The available selection of priority levels is determined by the network such that wireless communications that require high bandwidth will have a comparatively high priority.

The price charged for the wireless communications is determined according to subscription plans. Subscribers can pre-select the priority levels for wireless communication transactions. Subscribers can purchase an allottment of transaction units, where the amount to be charged for wireless communications is a number of units from the allottment of transaction units. The charge for a wireless communication can occur at the conclusion of a transaction, or at intervals during the transmission of the transaction. If the priority selected for the communication is changed during the course of the transaction, the charge can be pro-rated.

BRIEF DESCRIPTION OF THE DRAWINGS

FIG. 5A is a chart of transmission priority levels allocated for an e-mail application by a network, a user application, and a consumer according to the present invention.

FIG. 5B is a chart of transmission priority levels allocated for a file transfer application by a network, a user application, and a consumer according to the present invention.

FIG. 5C is a chart of transmission priority levels allocated for a voice-over-IP application by a network, a user application, and a consumer according to the present invention.

FIG. 6A is a table of steps for transmitting data packets across a wireless network for an e-mail application according to the preferred embodiment of the present invention.

FIG. 6B is a table of steps for transmitting data packets across a wireless network for a voice-over-IP application according to the preferred embodiment of the present invention.

FIG. 7 is a table of steps for transmitting data packets across a wireless network from a plurality of user applications in a wireless communications device.

DETAILED DESCRIPTION OF THE PREFERRED EMBODIMENTS OF THE INVENTION

Figure 1:
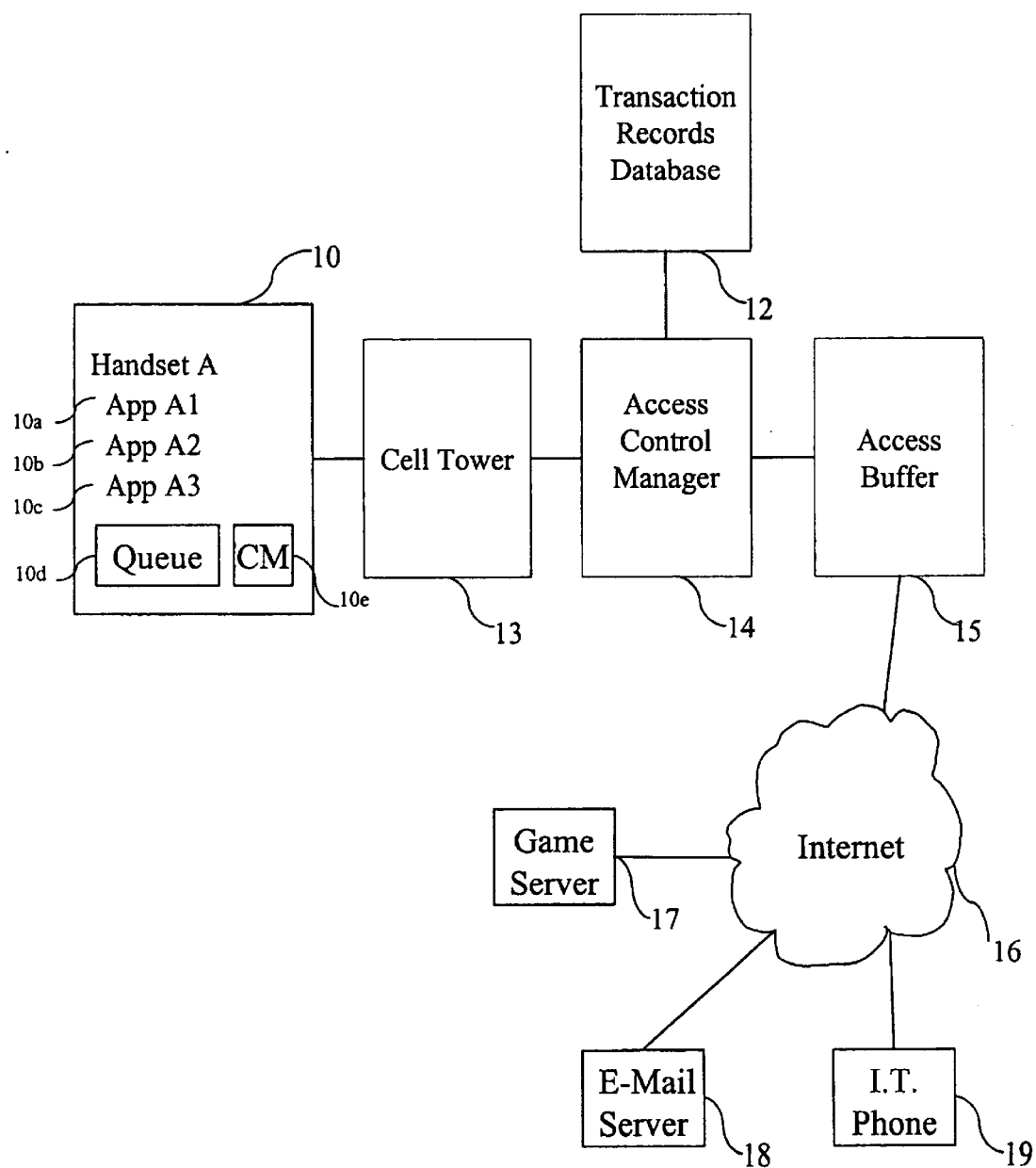
FIG. 1 is a schematic diagram of a wireless communication system according to the preferred embodiment of the present invention.

FIG. 1 is a schematic diagram of the multi-level wireless network service utilized in performing the method of the present invention. A mobile transmitter/receiver handset 10 is physically located in close proximity to cell tower 13, which is part of a packet switched wireless network. The handset is capable of supporting at least one or any number of applications, and contains a queue, or buffer, for temporarily storing data packets to be communicated to cell tower 13. The handset 10 is capable of running at least three applications, App. A1, App. A2, and App. A3, labelled 10a–10c, respectively, and contains queue 10d and communications manager 10e. A communications manager in the handset stores control information to be transmitted to cell tower 13 to initiate a wireless communication. Cell tower 13 transmits and receives radio frequency signals from handsets within a general region or cell. The handset 10 is to be used by a subscriber to the wireless network, and access to the wireless network is allocated according to a subscriber plan, to be discussed in further detail below Cell tower 13 is in communication with access control manager 14. Access control manager 14 also communicates with a plurality of other cell towers (not shown in FIG. 1) to control access to the wireless network. Access control manager 14 may be regionally located, as one of several access control managers on a network, or may be centrally located for the entire network. Access control manager 14 communicates with access buffer 15, which stores data received from the internet 16 before it is transmitted on the wireless network. Access control manager 14 is connected to a transactions records database 12 for maintaining transaction records and charged amounts for transactions. Alternatively, the transaction records database can be included within the access control manager 14. The data fields in the database might include: account or device ID (IP address, MIN), priority level, duration of session (seconds), packets transmitted (bytes), terminating location (IP address), session type (symmetric or asymmetric), latency level (allowable delay in milliseconds), and/or cell ID. The Internet can be operatively connected to a variety of servers, such as interactive game server 17, e-mail server 18, and voice-over-IP telephone server 19.

The applications supported by the handset are configured to communicate with the wireless network at one or more priority levels. The applications may include services such as e-mail, instant mail, unified messaging, short messaging, paging, world-wide web browsing, pointcast, interactive action games, internet telephony, internet facsimile, file transfer, etc. The priority levels are used by the access control manager 14 in the wireless network to determine the relative order of access to the wireless network for different applications during periods of congestion. Each application may have a default priority level. For example, internet telephony applications, which require rapid transmission of data packets in order to carry a natural-sounding voice communication, will likely have a higher default priority level than an e-mail application, which can usually be delayed without a noticeable effect.

To provide dynamic quality of service adjustments, many applications can be configured to operate at several different priority levels according to the relative importance of a particular transaction to a user. As an example, a subscriber may request to send an e-mail at a higher priority than the default level, when the e-mail contains time sensitive information and the delivery time is critical. By charging subscribers for access to the network according to the priority level for each transaction, the subscribers have a financial incentive to reserve designating high priority transactions for applications for which quick transmission is important.

Figure 2:
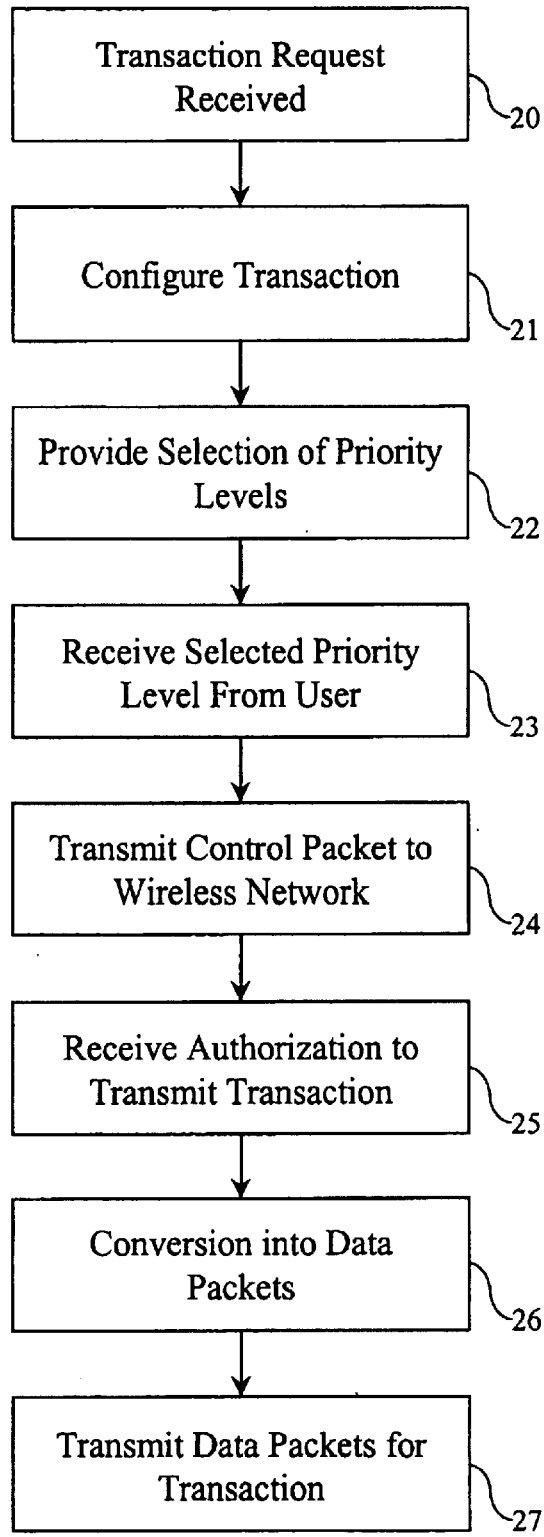
FIG. 2 is a flow diagram of the steps for configuring a transaction for transmission on the wireless network according to the preferred embodiment of the present invention.

FIG. 2 provides a flow diagram of the steps for initiating and transmitting a transaction from an application in a handset to transmit data along the wireless network, from the perspective of a controller in a handset. In step 20, a transaction request is received from a user application in a handset. As discussed above, this transaction request could relate to sending or receiving an e-mail, engaging in voice-over-IP, receiving a file transfer, etc. The user application in the handset next configures the transaction in accordance input from the user in step 21. For example, if the transaction is an e-mail communication to be transmitted from a handset, the handset receives the message text keyed in by the user, attaches any attachment files, and configures the header of the message to supply the required e-mail addressing information.

The handset next provides a selection of priority levels by which the network can transmit the transaction, in step 22. The wireless network itself provides a certain selection of priority levels that are approved for the type of transaction. Of those selected by the wireless network, the application designer selects a subset of priority levels in which the user application will operate correctly. From that subset, the subscriber pre-selects one or more priority levels to choose from when operating the handset, as part of the subscriber agreement. As will be discussed in further detail with reference to FIGS. 5A, 5B, and 5C, the selection of priority levels for any type of transaction is therefore the subset of the priority levels that are designated by the network, the application designer, and the subscriber.

After the subscriber chooses a priority level, in step 23, the handset converts the transaction data into data packets for transmission over the wireless network in step 24. A control packet is transmitted to the access control manager in the wireless network in step 25. Once authorization is received to transmit the transaction, in step 26, the handset transmits data packets on the wireless network, in step 27. Depending upon the transaction, the data packets are either transmitted directly from the user application, or the data packets are transmitted from a queue in the handset. If the transaction is a voice communication, the handset will also receive data packets as part of the transaction.

Depending upon the transaction, the handset may send an acknowledgment to the wireless network upon completion of the transaction, which is forwarded to a subscriber account to charge for the transaction. The subscriber can be charged according to the size of the transaction, the amount of time required for the transaction, or any of a variety of other factors, as will be described in further detail below. Although the user in the embodiment illustrated in FIG. 2 is charged only after sending an acknowledgment of the completion of the transaction, the wireless communication system can also be configured to charge the subscriber even if the transaction is not completed.

Figure 3:
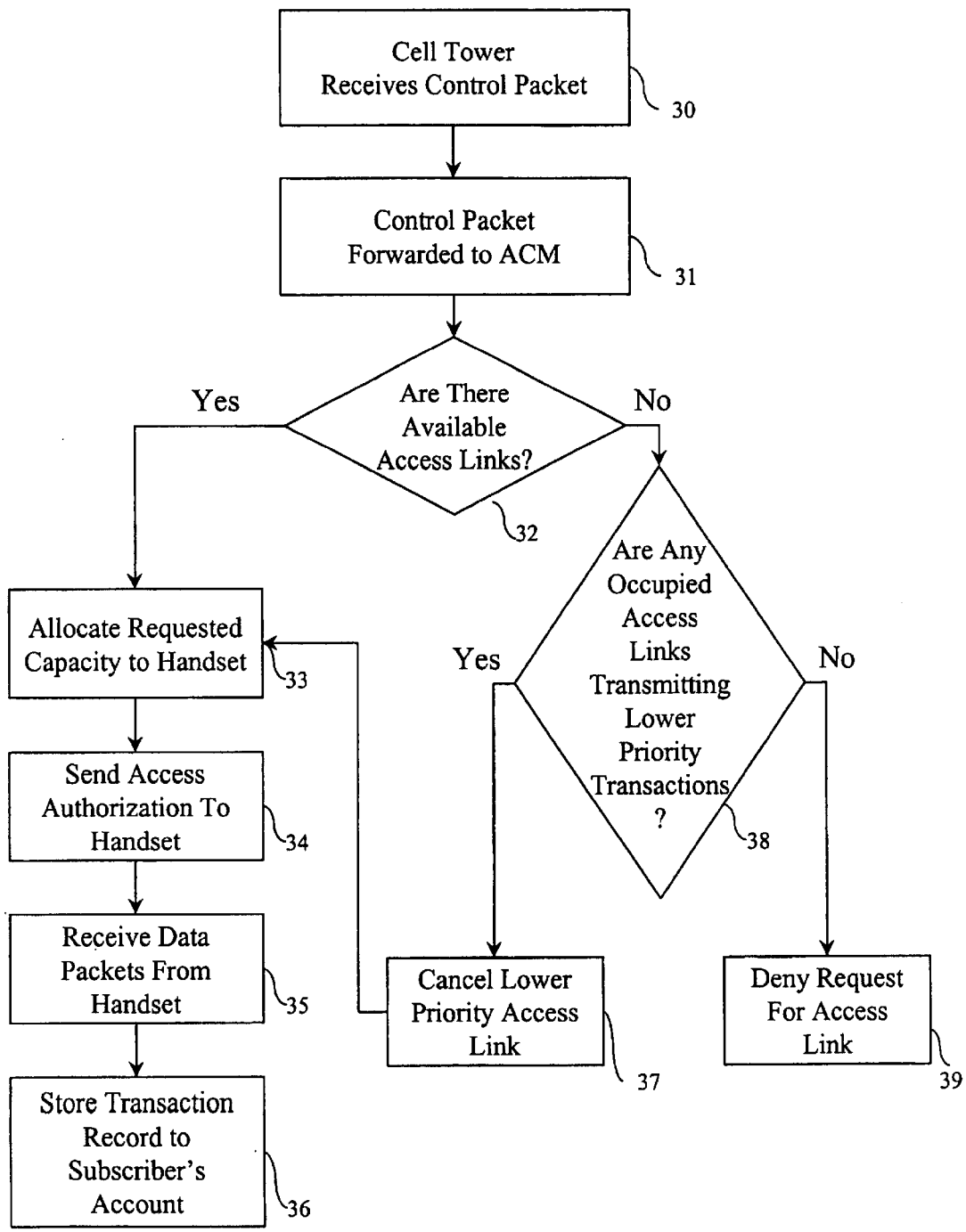
FIG. 3 is a flow diagram of the steps for transmitting a transaction on the wireless network from a wireless communications device according to the preferred embodiment of the present invention.

FIG. 3 describes how the wireless service responds to the transmission request. In step 30, the cell tower receives a control packet transmitted by the handset. Generally, the cell tower reserves capacity for transmission of control packets between itself and the handsets to indicate when authorization is granted for transactions. However, when the cell tower reaches full capacity, handsets may be temporarily unable to transmit control packets to the cell tower, which will be indicated by a "busy" signal during those times.

The cell tower forwards a control packet with a transmission request to the access control manager in step 31. The control manager then performs an evaluation of the existing capacity on the wireless network, in step 32. If there is an available access link, the requested capacity is allocated to the handset for the transaction, in step 33. The access control manager then sends access authorization to the corresponding cell tower to be transmitted to the handset in step 34. The handset begins transmission of the data packets, which are received by the cell tower in step 35. For transactions that involve bidirectional communications, data packets may also be received in the wireless network for transmission to the handset. At the conclusion of the transaction, a transaction record is stored in the subscriber's account for billing, in step 36.

When the ACM determines that there are no available access links on the wireless network in step 32, the access control manager next evaluates in step 38 whether there are any occupied access links that are transmitting packets for transactions of lower priority than the pending transaction request. If there is a lower priority transmission occurring, the access control manager performs a series of operations, in step 37, to discontinue the lower priority transaction in favor of a higher priority transmission. A signal is sent via a control packet to the handset that is engaged in the lower priority data packet transmission. The signal indicates to that handset transmitter/receiver that access to the wireless network is denied. The access control manager then allocates the requested capacity for the higher priority transmission, in step 33, and authorizes the handset to send data packets in step 34. The wireless network then receives the data packets in step 35.

If there is no lower priority transmission that is occurring, the access control manager sends a data packet to the requesting handset denying the request for an access link. A handset whose transaction is discontinued in favor of a transaction with higher priority operates in the same manner as a handset that is denied access from the outset. The wireless network can be configured in several ways for responding to a denial of network access, as will be further described below.

Figure 4:
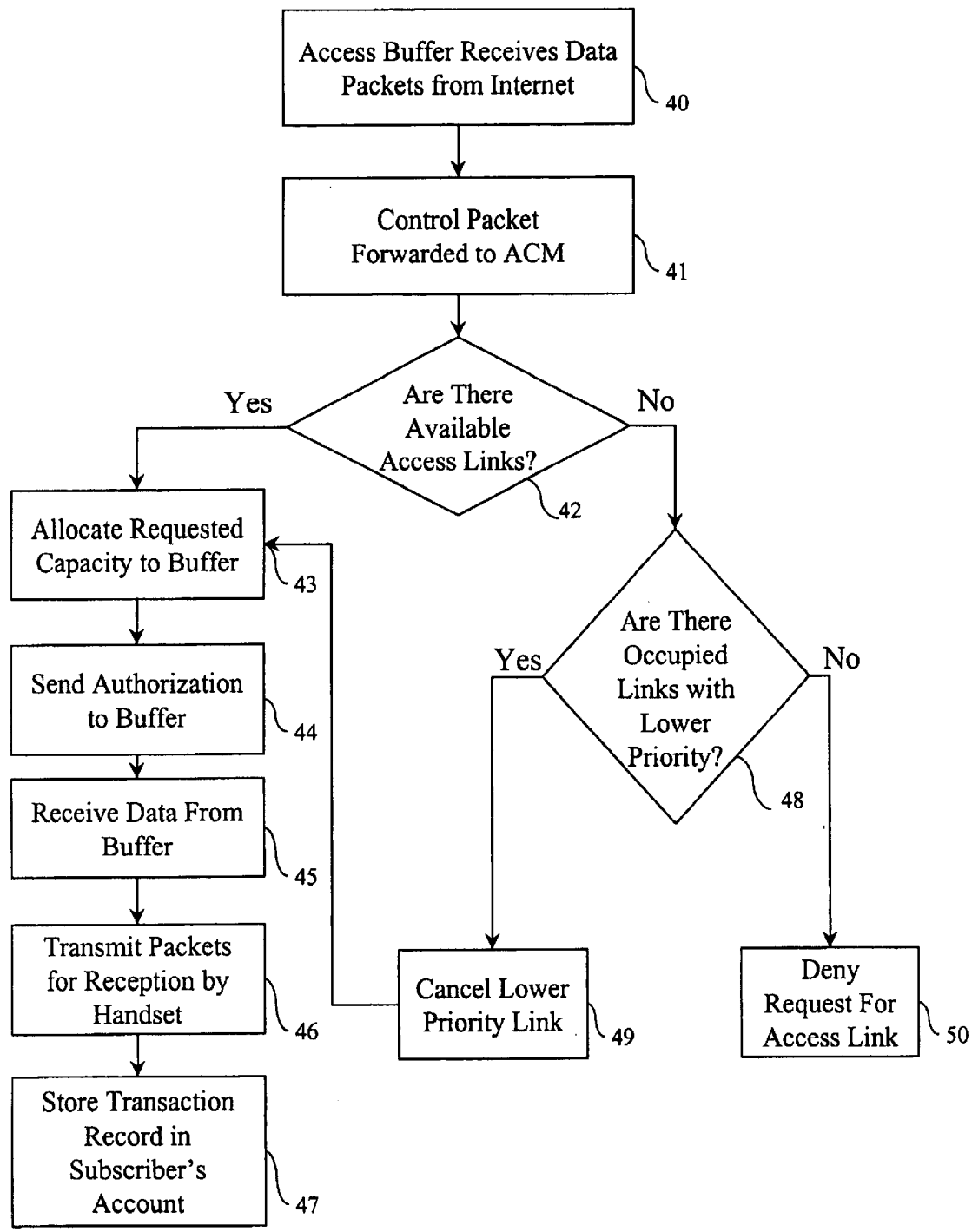
FIG. 4 is a flow diagram of the steps for allocating capacity on the wireless network for transmission of data packets to a wireless communications device according to the preferred embodiment of the present invention.

As shown in FIG. 4, the wireless network handles transmission of data packets that are incoming to the handsets from the internet in a similar manner to the outgoing transmission as described above. In step 40, the access buffer receives data packets from the internet. The control packet for this data is forwarded to the access control manager in step 41. The control manager then performs an evaluation of the existing capacity on the wireless network, in step 42. If there is an available access link, the requested capacity is allocated to the access buffer for the transaction, in step 43. An authorization signal is sent to the buffer in step 44, the data packets are forwarded to the cell tower in step 45, and the cell tower transmits the data packets over the wireless network for reception by the handset, in step 46. Upon completion of the transaction, a transaction record is stored in the subscriber's account, in step 47.

When there are no available access links on the wireless network, the access control manager next evaluates in step 48 whether there are any access links that are transmitting packets for transactions of lower priority than the pending transaction request. The priority level designated in a control packet for a transaction in the access buffer can be forwarded by the sender over the internet, or it may be the default level for the type of application that corresponds with the data packets. If there is a lower priority transmission occurring, the access control manager discontinues the lower priority transaction in favor of a higher priority transmission, in step 49. Access is then granted to the access buffer according to steps 43–46, as previously described. If there is no lower priority transmission that is occurring, the access control manager denies the request by the buffer for an access link in step 50.

There are several possible configurations for re-requesting transmission of a transaction by either a handset or the access buffer after access is denied or discontinued. Each of these configurations may be performed in the background of a handset's operation, during which time the handset can be used for other applications, including other transactions requiring wireless transmission of data.

In one embodiment, the handsets in the network can be designed to send a new request for access after a given delay. As an alternative to receiving repeated requests by the handsets and access buffer, the access control manager may be configured to broadcast a message after a period of time that describes the current capacity at each cell tower. The handsets that are denied access wait to send a request for an access link until the broadcast message is received. Once the broadcast message is received, the handsets send requests for access in accordance with the broadcast message. An additional alternative is to provide an access request queue residing at the access control manager to register the denied handset requests.

The wireless network can also include a network traffic capacity monitor to inform users as to whether it is necessary to select a higher priority level to gain effective access for a transaction. Each time that the network evaluates whether there is capacity at a cell site for a transaction of a certain priority level, the access control manager pools all of the access links to determine the capacity on the network. This information can then be used for sending a broadcast message to the handsets. As an example, consider a network priority implementation that determines access based upon five priority levels. The access control manager might broadcast a warning message to handsets when the network has not accepted a level 3 communication for over five minutes. Continuing with this example, if a user is about to send an e-mail message at level 3, the handset can suggest that the user consider sending the message with a higher priority. Even if the broadcast message merely indicates whether a cell site is "at capacity," "busy," or "not busy," a user can benefit from this information in determining whether to wait before engaging in a wireless transaction.

To assist the user in monitoring workflow, the handsets can provide an indicator that shows the percentage of data packets that were transmitted from the handset. If a user is not satisfied with the current access level to the wireless network, the handset can reconfigure the control packet associated with the transaction to transmit the remaining packets with a higher priority level. For example, if a user unsuccessfully requested to transmit an e-mail message at a low priority level, the user may wish to upgrade the transmission of the e-mail at higher priority. Perhaps at the higher priority level, the access control manager will immediately transmit the remaining packets in the queue. Thus, the quality of service over the wireless network can be changed dynamically, during an individual transaction.

When access for all or part of a transaction has been denied, a user might instead decide to cancel the delivery. For example, if a majority of the packets for an e-mail has remained in the handset queue for a long time, the user may wish to cancel the e-mail and call the intended recipient instead. The user can choose to delete a transaction or reschedule a transmission of the transaction for a specific time.

Each application in the handsets is configured to be run at a certain one or more priority levels. Examples illustrating how available priority is configured for an e-mail application, a file transfer application, and voice-over-IP are provided in FIGS. 5A, 5B, and 5C, respectively.

FIG. 5A provides an example of how the available priority levels may be determined for an e-mail application. The wireless network provider has four possible priority levels, and allows the e-mail to be transmitted at any of priority levels 2, 3, or 4, with the default at level 3. In this example, the carrier/service provider does not allow level 1 priority, the highest priority for e-mail communications to reserve the bandwidth for voice communications. The application developer designed the e-mail application to send e-mails at any of the first three priority levels. Presumably, the lowest priority level, a level 4 priority is not available because the e-mail application cannot run effectively with low priority. The customer, as part of the service plan with the carrier provider, has pre-designated priority levels 2 and 3 for selection. It may be possible that the customer's service agreement provides for a certain number of e-mail transmissions at each of levels 2 or 3, perhaps as part of a fixed monthly fee. Considering the available priority levels common to the carrier, application developer, and customer, a user can select transmission of an e-mail along the wireless network designated as priority level 2 or 3.

FIG. 5B provides an example of how the priority levels are determined for a bulk download of a large file or document from an internet web site. The wireless carrier only allows bulk file transfers to be configured as level 4 priority, the lowest priority. Otherwise, the bulk download will overly tax the wireless servers, creating a delay for many other applications. The application developer designed its browser to allow file transfers at any of the priority levels. The customer, as part of the service plan with the carrier, can only pre-designate priority level 4 for selection. Accordingly, the file transfer is to be sent as level 4 priority.

FIG. 5C is an example of a configuration of priority levels for voice-over-IP telephony. The carrier allows voice traffic over the wireless network at any of the four priorities. However, in reality, an application developer can only implement voice-over-IP if the packets are transmitted over levels 1, 2, or 3. Level 3 priority is actually only useful for voice-mail, because the transmission of the data packets may separated by a minute or more, which would be completely ineffective for a normal two-way speech conversation. The application developer configures the application with level 2 as the default. For one-way speech communications such as voice mail, the system could operate at a lower priority level by gradually reassembling or reconstructing the message as packets are received. The customer, who may wish to utilize voice-over-IP for telephony and voice mail services, preconfigures the system to allow a choice between levels 1, 2, or 3.

FIGS. 6A and 6B illustrate the transmission of data packets across the wireless network for an e-mail communication and a voice-over-IP communication, respectively. Because a speech communication requires bi-directional data transmission, as opposed to transmission in a single direction, the wireless network allocates capacity differently for voice-over-IP, as opposed to e-mail or other unidirectional communications. Voice-over-IP is also different because the system needs to reserve capacity for transmission of a certain number of data packets per second in order to assure a reasonable speech quality.

FIG. 6A is a table illustrating the steps of transmitting an e-mail from a handset in the wireless network according to the preferred embodiment of the invention. In the example provided in this table, the e-mail has a level 2 priority, and the network is almost at full capacity. Because the e-mail is designated for level 2 priority, the communication can be temporarily discontinued if the network is at full capacity and the network receives a request for a higher priority transaction. In this example, the e-mail communication is composed of five data packets, stored in a queue in the handset. The communication is interrupted once in view of a higher priority transaction.

At time 1, the handset sends a control packet to the cell tower to request capacity for a level 2 priority communication. The access control manager evaluates the capacity at time 2, discontinues a lower priority transaction to allow for the e-mail communication at time 3, and sends authorization to the handset at time 4. At times 5–7, the handset removes data packets of the e-mail communication from the handset queue for transmission over the wireless network. In the meantime, the cell side receives a request for a higher priority level 1 communication. Because the network is at full capacity at this time, the cell side generates a discontinue message to the handset at time 8, and provides access for another transaction at time 9. The network also completes another level 2 transaction at time 9, and broadcasts the available capacity for a level 2 communication at time 10. The handset sends a transmission request at time 11, receives authorization at time 12, and completes the transmission of the data packets for the e-mail communication at times 13 and 14.

FIG. 6B is a table illustrating the steps of transmitting a bidirectional voice-over-IP communication in the wireless network according to the preferred embodiment of the invention. In the example provided in this table, the application has a level 1 priority. However, because the voice communications do not require constant transmission, a level 1 priority voice communication can be interrupted for short time periods, e.g., when there are gaps in the speech communication. Therefore, when the handset ("vocoder handset") periodically omits sending data packets, the capacity is filled by a transaction of a lower priority communication.

At time 1, the vocoder handset sends a control packet to request a level 1 priority voice communication. At time 2, the access control manager sends authorization to the vocoder handset to begin the voice communication. At time 3, the vocoder handset begins sending data packets for the transaction. At the same time, another handset receives authorization to transmit a data packet along the same access link. At time 4, the vocoder handset does not send a data packet, but another handset sends a data packet. At time 5 the vocoder handset resumes sending data packets, while yet another handset sends a request for a transaction. At time 6, the vocoder handset receives data packets from the internet. At the same time, the other handset receives authorization to initiate its transaction. At step 7, the vocoder handset again omits from sending a data packet, while the other handset begins sending data packets. This process can continue until the completion of the voice communication.

FIG. 7 provides another table illustrating the steps of transmitting data packets for several different transactions, of different priorities, generated in the same handset. In the table of FIG. 7, transaction "A" is of priority level 2, transaction "B" is of priority level 3, and transaction "C" is of priority level 1. Each occurrence of "A," "B," or "C" may represent a single data packet for that transaction, or a group of data packets from that transaction.

At time 1 in FIG. 7, the handset requests capacity to send data packets for a priority level 2 communication. The user has already generated the data to be transmitted and the handset has sent the data to the handset queue as data packets "A." The access control manager sends authorization for the transmission at time 2. At the same time, the handset places data packets "B" into the queue. Since data packets "B" are of a lower priority than data packets "A," the data packets "B" are at the end of the queue (from right to left). At times 3 and 4, the handset sends data packets "A" to the cell side. At time 5, the handset receives a discontinue message to stop sending level 2 priority packets. The handset next places data packets "C" of level 1 priority into the queue at time 6, and requests access for a level 1 priority communication. The handset receives authorization to transmit at time 7, and sends data packet "C" at time 8. This operation continues until the queue is empty or the handset is turned off.

There are a multitude of service plans that may be available for charging a subscriber for wireless communication services in accordance with the preferred embodiments. As a standard subscription, a subscriber may be charged for each transaction at a rate corresponding with the selected priority level for the transaction. Depending upon the configuration of the network and the relative congestion on the network, it might be possible that subscribers are not charged for transactions at the lowest priority level. For more frequent users, a subscriber may be charged a monthly fee to receive access for a certain number of transactions at each priority level. With either plan, the subscriber has an incentive to designate transactions with lower priority when the transaction is not urgent.

The subscriber may choose to pre-configure a subscriber plan to pre-select the available priority levels for certain transactions. For example, if there are four priority levels by which transactions may be transmitted, the subscriber may wish to designate the highest two priority levels, levels 1 and 2, for voice service, levels 24 for e-mail service, and only level 4 for participating in interactive games. One advantage of pre-selecting the available priority levels for transactions is to control use by others who will use the subscriber's handset, such as the subscriber's children. Thus, this feature allows the subscriber to attempt to control the potential costs associated with the wireless service. Another advantage of pre-selection is that it may assist the wireless network itself in predicting the volume of transactions on the network by region. Therefore, the wireless network itself may provide a financial incentive for a subscriber to pre-select or designate priority levels.

A subscriber may be charged for the wireless service per transaction, according to the number of packets required for a transaction, or by the number of minutes occupied on the wireless network to perform each transaction. The rate at which a subscriber is charged corresponds with the priority selected for the transaction. As an example, a voice communication would most likely be charged by units of time or by the number of packets transmitted, because the length or duration of a voice communication is generally at the subscriber's discretion. An e-mail communication may be charged per transaction or per number of packets.

For transactions that charge by units of time, the network may be configured such that a subscriber is not charged during the period of time that a communication is discontinued. Further, if a subscriber opts to change the transmission priority level during the course of a transaction, the transaction charge will be similarly pro-rated.

To assist a subscriber in selecting a priority level, the wireless communication system can provide information to subscriber handsets regarding the network traffic in the subscriber's present cell site. As previously described, the cell site may periodically broadcast messages indicating the relative capacity of the network. For example, if a subscriber is informed that the network is busy, the subscriber may opt to transmit a transaction of relative importance at a higher priority to ensure prompt transmission. Handsets can also be configured to either suggest a priority level to the subscriber or automatically select a priority level for the transaction.

Thus, it is readily seen that the method and system of the present invention provides for improved access for transmission of data packets of transactions from a handset over a packet switched wireless network when many of the transactions are of differing levels of priority and urgency, and there is limited capacity on the wireless network. The system authorizes mobile communications devices to transmit and receive data packets until another request is received with higher priority. Within each handset, transactions that are pending are scheduled according to priority within the handset. This system allows for quality of service over the wireless network by allocating the resources according to urgency. The network will likely charge more for higher priority transactions.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for pricing wireless communications services on a wireless network according to a selected transmission priority level, comprising the steps of:

receiving a request to transmit a wireless communication transaction on a wireless network at a priority selected from a plurality of available priorities provided to a user;

charging the user an amount for the wireless communication transaction at a price corresponding to the priority to be selected;

temporarily discontinuing a transmission of a lower priority transaction in favor of a higher priority transaction when network capacity reaches a predetermined level; and allowing the continued transmission of the lower priority transaction when network capacity allows.

2. The method for pricing wireless communications services according to claim 1, wherein the wireless network is a cellular network, and the capacity level is determined locally according to a percentage of available access links into the network at a cell or sector.

3. The method for pricing wireless communications according to claim 1, wherein the selection of the plurality of priorities provided is predetermined by the network according to transaction type in order to maximize capacity on the wireless network according to the time sensitivity of the type of transaction.

4. The method for pricing wireless communications according to claim 3, wherein the selection of the plurality of priorities for speech communication transactions and e-mail transactions are predetermined such that speech communication transactions are of higher priority than e-mail transactions.

5. The method for pricing wireless communications according to claim 3, wherein the selection of the plurality of priorities for speech communication transactions and file transfer transactions are predetermined such that speech communication transactions are of higher priority than file transfer transactions.

6. The method for pricing wireless communications according to claim 3, wherein transactions that require greater bandwidth for operation are of higher priority than transactions that require only an available bit rate for operation.

7. The method for pricing wireless communications according to claim 1, wherein a subscriber is provided access to the wireless network according to a subscriber plan, and the selection of the plurality of priorities provided is pre-selected by the subscriber, wherein the cost of the subscriber plan corresponds with availability for performing transactions of higher priority.

8. The method for pricing wireless communications according to claim 7, wherein a subscriber authorizes a user to use the wireless network according to the subscriber plan, such that the subscriber can limit the user's access to the wireless network for high priority transactions.

9. The method for pricing wireless communications according to claim 1, further comprising the step of providing a selection of a plurality of priorities available for each of a plurality of transaction types, wherein the selections of the plurality of priorities are subsets of priorities that are predetermined by the network and are pre-selected by the subscriber.

10. The method for pricing wireless communications according to claim 1, wherein the wireless communication transaction is generated by a user application, and the selection of the plurality of priorities provided is pre-configured in the user application.

11. The method for pricing wireless communications according to claim 10, wherein the selection of the plurality of priorities is a subset of priorities that are pre-configured in the user application and are authorized by the network.

12. The method for pricing wireless communications according to claim 1, wherein a subscriber is provided access to the wireless network according to a subscriber plan in which the subscriber purchases an allotment of transaction units, and the amount to be charged for the wireless communication transaction at the selected priority is a number of units from the allotment of transaction units.

13. The method for pricing wireless communications according to claim 12, wherein higher priority transactions are charged more units than lower priority transactions.

14. The method for pricing wireless communications according to claim 1, wherein the step of charging an amount for the wireless communication transaction occurs only at the conclusion of the transaction.

15. The method for pricing wireless communications according to claim 1, wherein the step of charging an amount for the wireless communication transaction occurs at intervals during the transmission of the transaction, at a rate corresponding to the selected priority.

16. The method for pricing wireless communication according to claim 15, wherein the step of charging an amount for the wireless communication only occurs during periods of time when the network has capacity for transactions at the selected priority.

17. The method of pricing wireless communications according to claim 1, further comprising the steps of:

receiving a request to transmit the remainder of the wireless communication at a second priority from the plurality of available priorities;

transmitting portions of the wireless communication transaction during periods of time when the network has capacity for the transactions at the second selected priority, until completion of the transaction; and charging an amount for the remainder of the wireless communication transaction at a price corresponding to the second selected priority.

18. The method for pricing wireless communications according to claim 17, wherein the step of charging an amount of the wireless communication transaction occurs at intervals during the transmission of the transaction, such that the first portion of the transaction occurs at a rate corresponding to the second selected priority.

19. A method for pricing a wireless communication transaction on a wireless cellular network having a plurality of regional cells according to the capacity at a cell, comprising the steps of:

evaluating the capacity of a cell to determine the accessibility to the cell for transmitting transactions at each of a plurality of priority levels, wherein each wireless communication transaction is associated with a priority level, and higher priority transactions are transmitted before lower priority transactions;

broadcasting an indication of the capacity of the cell to wireless communications devices operated within the cell;

receiving a request from a wireless communications device to transmit a wireless communication transaction at a selected priority level from the plurality of priority levels, wherein the selected priority level is determined based upon the capacity of the cell broadcasted to the wireless communications device;

allocating capacity to the wireless communications device for the transmission of the wireless communication transaction according to the selected priority;

wherein the price of the wireless communication is determined according to the selected priority;

temporarily discontinuing the transmission of the transaction in favor of a higher priority transaction when network capacity reaches a predetermined level; and allowing the continued transmission of the transaction when network capacity allows.

20. The method for pricing a wireless communication transaction according to claim 19, wherein the capacity of the cell is determined based upon an average amount of time required to transmit transactions at each priority level during a preceding time period.

21. The method for pricing a wireless communication transaction according to claim 19, wherein the wireless communications device indicates a preferable priority level for the transaction to a subscriber based upon the indicated capacity of the cell.

22. The method for pricing a wireless communication transaction according to claim 19, wherein the plurality of priority levels to be selected is predetermined by the network according to transaction type in order to maximize capacity on the wireless network according to the time sensitivity of the type of transaction.

23. The method for pricing wireless communications according to claim 22, wherein transactions that require greater bandwidth for operation are of higher priority than transactions that require only an available bit rate for operation.

24. The method for pricing wireless communications according to claim 19, wherein a subscriber is provided access to the wireless network according to a subscriber plan, wherein the cost of the subscriber plan corresponds with availability for performing transactions of higher priority.

25. The method for pricing wireless communications according to claim 24, wherein the subscriber authorizes a user to use the wireless network according to the subscriber plan, such that the subscriber can limit the user's access to the wireless network for high priority transactions.

26. A method for pricing the transmission of wireless communications transactions generated on a wireless communications device according to a selected transmission priority level, comprising the steps of:
  providing a selection of priorities available for transmitting wireless communication transactions of a plurality of different types, wherein each type of transaction is generated by a different user application operating on the wireless communications device;
  transmitting portions of wireless communication transactions requested for transmission on the wireless communications device when the network has capacity for transactions at the selected priorities;
  wherein the prices of the wireless communications are determined according to the period of time required for transmission of the transactions;
  receiving instructions to temporarily discontinue the transmission of portions of wireless communication transactions in favor of at least one higher priority transaction when network capacity reaches a predetermined level; and
  sending a request to continue the transmission of the portions of wireless communication transactions upon receiving a broadcast message that describes available network capacity.

27. The method for pricing the transmission of wireless communications transactions according to claim 26, wherein transactions that require greater bandwidth for operation are of higher priority than transactions that require only an available bit rate for operation.

28. The method for pricing the transmission of wireless communications transactions according to claim 26, wherein the price of a wireless communication transaction is determined according to pro-rated rates when the priority selected is changed before the transmission of the transaction is completed.

29. A wireless communications system for allocating network access according to priorities designated for requested transactions of wireless communications, comprising:
  (a) a wireless network having a plurality of access links for transmitting transactions;
  (b) a plurality of wireless communications devices for requesting transmission of transactions on the wireless network, wherein a designated priority level is associated with each transaction;
  (c) an access control manager for scheduling transmission of transactions, when all of the plurality of access links are occupied, by performing the following:
    (i) identifying a transaction that is being transmitted over the wireless network and is of lower priority than a requested transaction,
    (ii) discontinuing the transmission of the transaction of lower priority,
    (iii) authorizing the transmission of the requested transaction, and
    (iv) authorizing continued transmission of the discontinued transaction of lower priority upon completion of the transmission of the requested transaction; and
  (d) a transaction records database connected to the access control manager for charging subscribers an amount for wireless communication transactions at a price corresponding to the priority selected for the transactions.

30. A method for pricing wireless communications services on a wireless network according to a selected transmission priority level, comprising the steps of:
  providing a selection of a plurality of priorities available for transmitting a wireless communication transaction on a wireless network;
  charging a user an amount for the wireless communication transaction at a price corresponding to the priority to be selected;
  receiving a request to transmit a wireless communication transaction at a selected priority from the plurality of available priorities;
  transmitting portions of the wireless communication transaction during periods of time when the network has capacity for transactions at the selected priority;
  receiving a request to transmit the remainder of the wireless communication at a second selected priority from the plurality of available priorities;
  transmitting portions of the wireless communication transaction during periods of time when the network has capacity for transactions at the second selected priority, until completion of the transaction; and
  charging an amount for the remainder of the wireless communication transaction at a price corresponding to the second selected priority,
  wherein transactions of lower priority are temporarily discontinued in favor of higher priority transactions when network capacity reaches a predetermined level.

31. A method for pricing wireless communications services on a wireless network according to a selected transmission priority level, comprising the steps of:
  providing a selection of a plurality of priorities available for transmitting a wireless communication transaction on a wireless network;
  charging a user an amount for the wireless communication transaction at a price corresponding to the priority to be selected;
  receiving a request to transmit a wireless communication transaction at a selected priority from the plurality of available priorities;

transmitting portions of the wireless communication transaction during periods of time when the network has capacity for transactions at the selected priority;

receiving a request to transmit the remainder of the wireless communication at a second selected priority from the plurality of available priorities;

transmitting portions of the wireless communication transaction during periods of time when the network has capacity for transactions at the second selected priority, until completion of the transaction; and charging an amount for the remainder of the wireless communication transaction at a price corresponding to the second selected priority, wherein transactions of lower priority are temporarily discontinued in favor of higher priority transactions when network capacity reaches a predetermined level, and wherein the step of charging an amount for the wireless communication transaction occurs at intervals during the transmission of the transaction, such that the first portion of the transaction occurs at a rate corresponding to the first selected priority, and the second portion of the transaction occurs at a rate corresponding to the second selected priority.

* * * * *